Aug. 15, 1933.    C. C. HERITAGE ET AL    1,922,366
PROCESS FOR SEPARATING BAST FIBERS FROM SHIVES
Filed Nov. 17, 1931    2 Sheets-Sheet 1

Patented Aug. 15, 1933

1,922,366

UNITED STATES PATENT OFFICE 1,922,366

PROCESS FOR SEPARATING BAST FIBERS FROM SHIVES

Clark C. Heritage, Rumford, Maine, Earl R. Schafer, Madison, Wis., and Lynn A. Carpenter, Rumford, Maine, dedicated to the Government and the People of the United States of America Application November 17, 1931
Serial No. 575,650

1 Claim. (Cl. 92—33)

(Granted under the Act of March 3, 1883, as amended April 30, 1928; 370 O. G. 757)

This application is made under the act approved April 30, 1928, and the invention herein described, if patented, may be manufactured and used by or for the Government for governmental purposes without payment to us of any royalty thereon.

We hereby dedicate the invention herein described to the free use of the public to take effect upon the granting of a patent to us.

Our invention relates to a process of separating seed flax straw into two components; viz: bast fiber (which corresponds to linen fiber in textile work) and shives, which is the broken woody interior portion of the stem. The material is shaken to remove chaff, seed pods, etc., after which it may be cut as in a rag cutter. The rag cutter used in this work is of the ordinary type used in paper mills. The material is cut to lengths varying from 1 to 3 inches. A certain amount of the straw is reduced to particles similar to coarse sawdust.

The cut material is extracted with organic solvent to remove gums, resins, waxes and fats. This step is not essential to the subsequent operations, but may be done to recover possible valuable materials of which there are from 3 to 3.5 per cent. The solvent used in the experimental work has been a mixture of 2 parts (by volume) of ethyl alcohol and 1 part of benzene. Other commercial solvents such as ether, gasoline, etc., may be used. Various solvents will extract various mixtures of materials.

The apparatus used in extracting consists of a tank in which the material is soaked in the solvent for a convenient length of time. The solvent is drawn off and distilled. In the experimental work the concentrated extract is allowed to remain in the still until the material has received three successive extractions, when the concentrated extract is drawn off and the remaining solvent removed by evaporation. The recovered solvent is used for succeeding extractions.

The cut material (which may or may not have been extracted with organic solvent) is extracted with a dilute alkaline solution or the material is allowed to ret with natural or cultured bacteria, to dissolve the gums, pectins, etc., binding the bast fiber and shives. In the experimental work various dilute alkaline solutions have been found suitable. A 1 per cent solution of caustic soda has been used most frequently; milk of lime and sodium sulphite less frequently. The extraction is made at boiling temperature. Allowing to ret in water has also been used.

The apparatus consists of an open vessel provided with steam coils for heating the contents. After extraction is complete the contents of the vessel are emptied into a screen, the liquor drained off and the material washed free of chemical. The material may then be dried.

The extracted material is thoroughly disintegrated or shredded. In the present experiments it has been necessary to dry the material previous to shredding, because of the limitations of the shredding equipment. With suitable equipment the material may be shredded without previous drying.

The apparatus used is a swing hammer shredder.

The shredded material is screened on diaphragm screens. The diaphragm screens are of the type ordinarily employed in pulp and paper mills. The material is successively screened through a series of screen plates as follows: (a) The shredded material in dilute suspension in water is screened on a 12-cut plate (i. e. a plate containing slots 0.012 inches wide). 65 per cent of the material is retained on the screen, and contains approximately 95 per cent of shives and 5 per cent of bast fiber: (b) material passing through the 12 cut plate is screened on an 8 or 9 cut plate. The material retained on the screen consists of about 10 per cent of the original shredded material. Its composition is nearly the same as the original material and so is returned to the process: (c) the material passing through the 8 cut screen (or 9 cut) consists of approximately 25 per cent of the original shredded material. It contains approximately 75 per cent of bast fiber and 25 per cent of shives. It is then screened on 24 mesh wire screen. The material retained on the wire screen consists of about 19 per cent of the shredded straw, and is composed of approximately 85 per cent bast fiber and 15 per cent shives; (d) the material passing the 24 mesh wire screen consists of about 6 per cent of the original shredded straw. Its composition is approximately 50 per cent bast fiber and 50 per cent shives and is quite finely divided. It may be returned to the process or otherwise utilized without further separation treatment as a source of cellulose.

Figure 1:
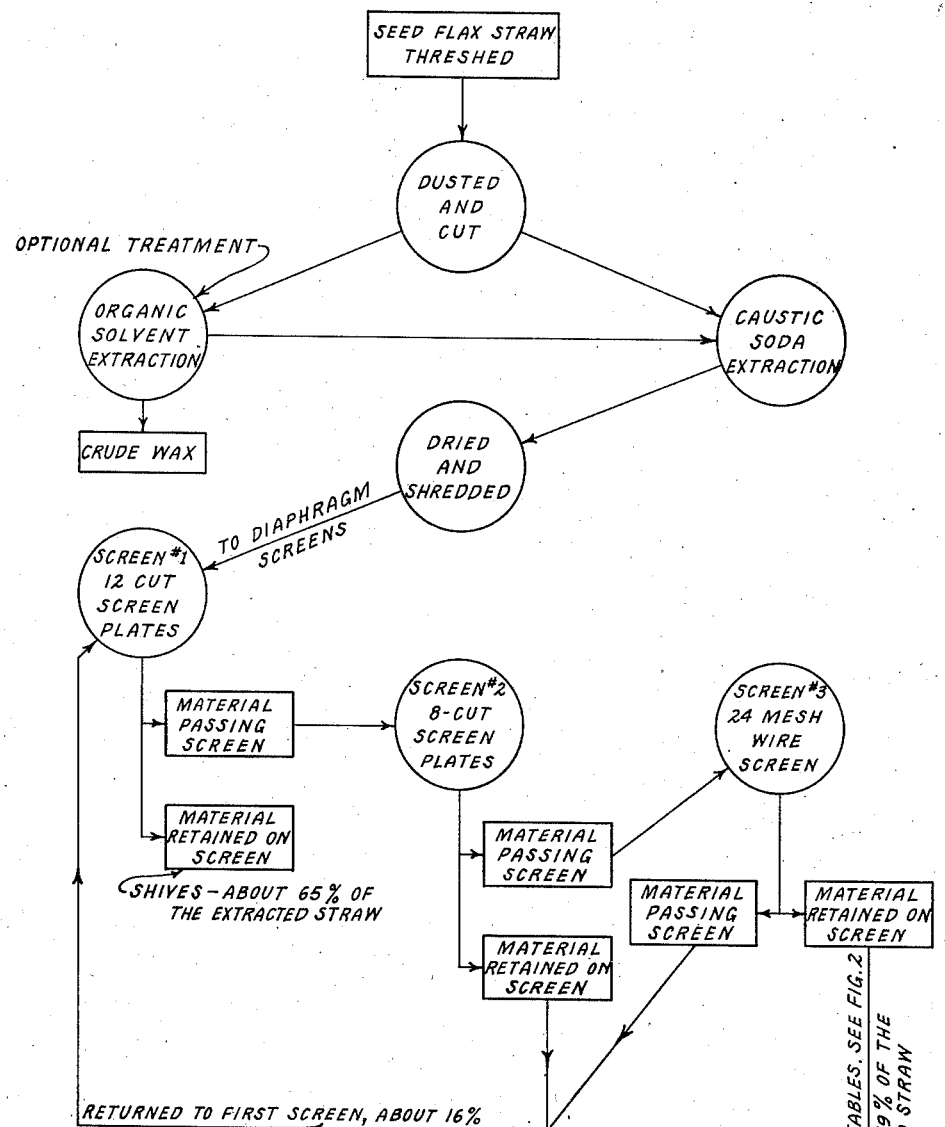
Fig. 1 shows a hypothetical flow sheet of the material through the extraction and screening processes as developed from one of the experiments.
Figure 2:
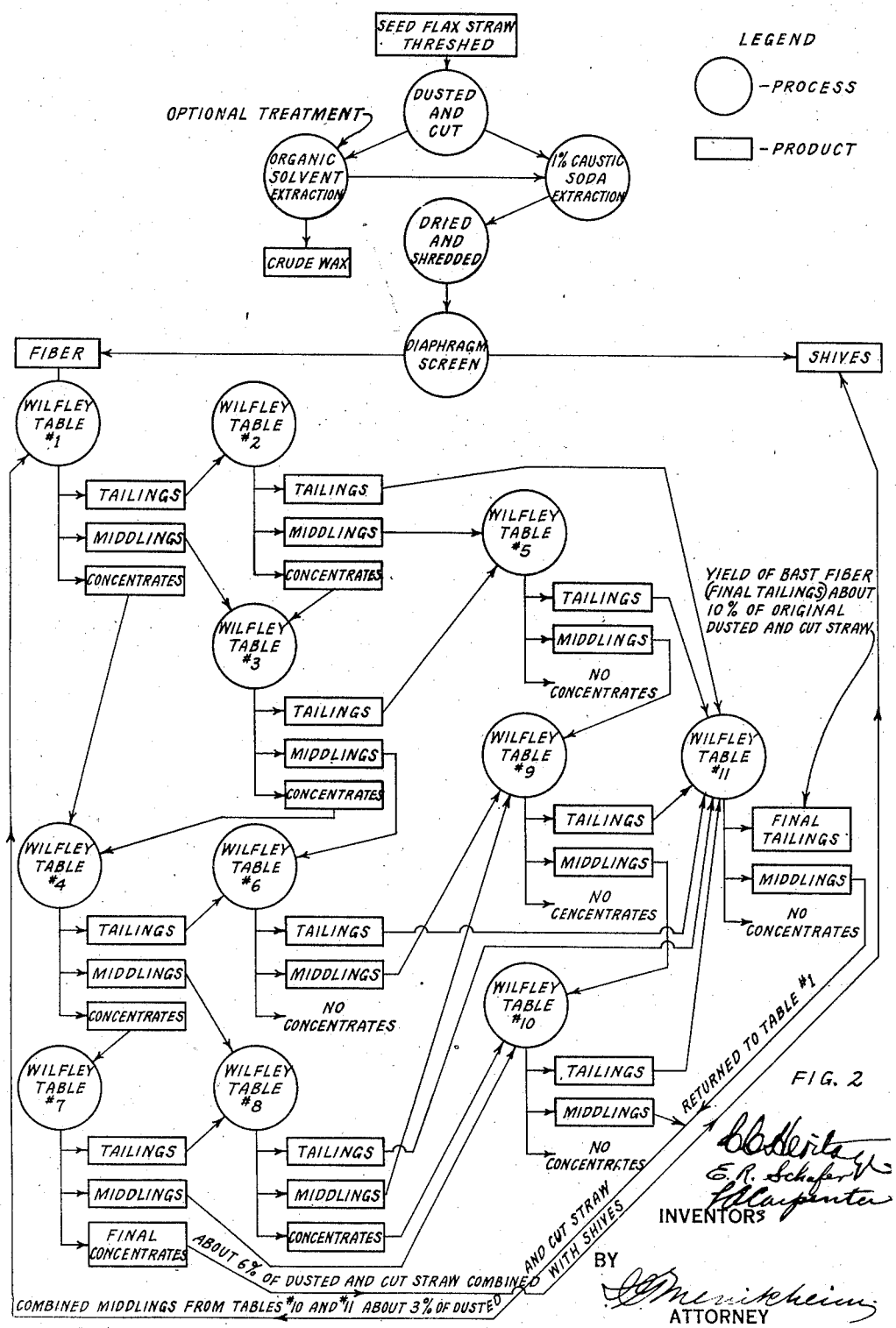
Fig. 2 shows a hypothetical flow sheet of the material through the extraction, screening and Wilfley table processes as developed from the results of one of the experiments.

The portion of material retained between the 8-cut plate and the 24 mesh wire consisting of 19% of the original straw but rich in valuable bast fiber, is passed over a Wilfley table. The Wilfley table is of the common type used in dressing ores. The deck or table surface contains a series of shallow grooves or riffles which are long and narrow and arranged parallel to each other and to the long edge of the table. The table is given an endwise shaking motion by suitable eccentrics, toggles, and springs. The backward movement is more rapid than the forward. This motion is in the direction of the riffle grooves and impels the material (in dilute suspension in water) forward. The material is fed onto the table at one corner of the mechanism end. The movement of material is diagonally across the table surface, the slope of which, toward the long edge, may be varied. The small shives in the material are separated from the clusters of bast fiber by the motion of the table. The shives settle into the grooves and work off at the end. The clusters of bast fiber (being more buoyant because they are loosely clustered) float on the surface of the water flowing across the grooves and are washed off at the side. The cleanest bast fiber is obtained at a region about the middle of the long side, corresponding to "tailings" in ore dressing. There is a region near the corner of the table where bast and shives are mixed which correspond to "middlings" in ore dressing. In experiments so far on a small size table it is necessary that the "tailings" and "middlings" be passed over the table more than once to effect the maximum separation. The final shives which correspond to "concentrates" contain about 15 per cent of bast and the final bast fiber ("tailings") contains about 5 per cent of shives.

The two materials bast fiber and shives may now be processed by methods most suited to their individual chemical and physical properties. The bast fiber may be made into the highest grades of strong white paper. The shives may be made into cheaper grades of paper such as book and magazine paper and into cellulose products such as rayon, cellulose lacquers, or other cellulose derivatives.

It is of course understood that variations in the foregoing scheme of separation do not constitute departures from the spirit of the invention, it is further understood that the process is applicable to the separation of mixtures of other fibrous materials of different size and/or specific gravity, such as for instance mixtures of chemical and ground-wood pulps, mixtures of fibers from old papers or mixtures of fibers and extraneous particles of dirt, rubber, etc.

We claim:

The method of separating seed flax straw and materials of like nature into two components, which consists in subjecting the material to vibration to remove chaff, seed pods, and other foreign constituents, cutting into varying lengths, extracting with organic solvents to remove gums, resins, waxes, and fats, drawing off the solvents, then subjecting the resulting material to the action of a heated dilute alkaline solution, extracting the remaining material, washing, drying, disintegrating and screening by the use of the conventional type of Wilfley table or vanner.

CLARK C. HERITAGE.
EARL R. SCHAFER.
LYNN A. CARPENTER.